(12) United States Patent
Buell

(10) Patent No.: US 6,213,240 B1
(45) Date of Patent: Apr. 10, 2001

(54) MOTORCYCLE ENGINE AND TRANSMISSION MOUNTING SYSTEM

(75) Inventor: Erik F. Buell, Mukwonago, WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 09/365,299

(22) Filed: Jul. 30, 1999

(51) Int. Cl.⁷ .................................................... B60K 5/12
(52) U.S. Cl. ........................ 180/228; 180/299; 267/281
(58) Field of Search .................................. 180/228, 219, 180/291, 299; 267/140.11, 140.13, 281

(56) References Cited

U.S. PATENT DOCUMENTS

| | | | |
|---|---|---|---|
| 4,066,142 | * 1/1978 | Hopper | 180/33 A |
| 4,237,996 | * 12/1980 | Matsuda et al. | 180/229 |
| 4,323,135 | * 4/1982 | Tominaga et al. | 180/228 |
| 4,421,195 | * 12/1983 | Aiba | 180/228 |
| 4,487,285 | * 12/1984 | Tomita et al. | 180/228 |
| 4,776,423 | 10/1988 | Buell | 180/228 |
| 5,390,758 | 2/1995 | Hunter et al. | 180/228 |
| 5,639,075 | * 6/1997 | Tyree | 267/281 |
| 5,829,730 | * 11/1998 | Ott | 248/635 |
| 5,918,695 | * 7/1999 | Matsuura et al. | 180/226 |

FOREIGN PATENT DOCUMENTS

2075444 * 11/1981 (GB).

* cited by examiner

*Primary Examiner*—Brian L. Johnson
*Assistant Examiner*—Daniel Yeagley
(74) *Attorney, Agent, or Firm*—Michael Best & Friedrich LLP

(57) ABSTRACT

A motorcycle includes a plurality of tie rods, a front resilient mount interconnecting the engine with the frame, and a rear resilient mount that interconnects the frame with the transmission, and that is positioned above the pivot mount between the swing arm and the transmission.

17 Claims, 8 Drawing Sheets

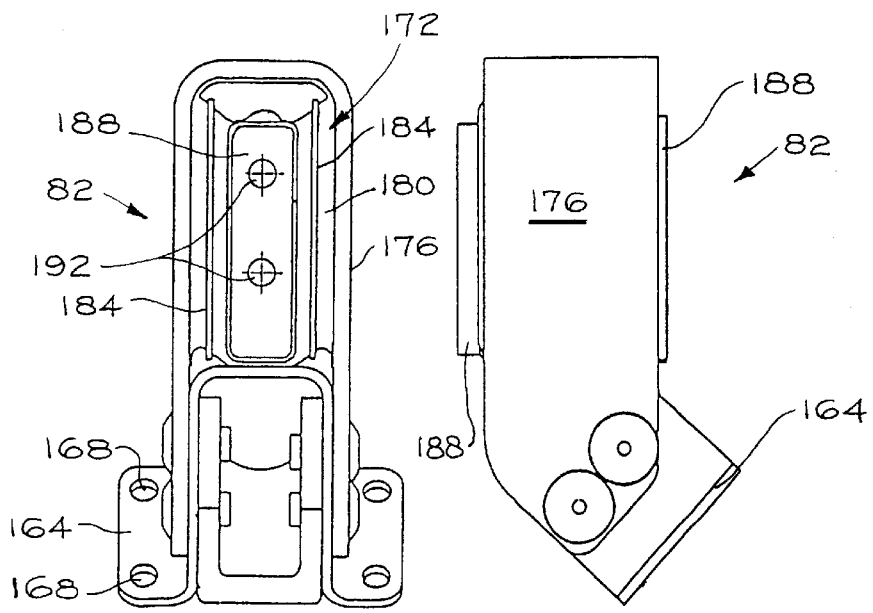
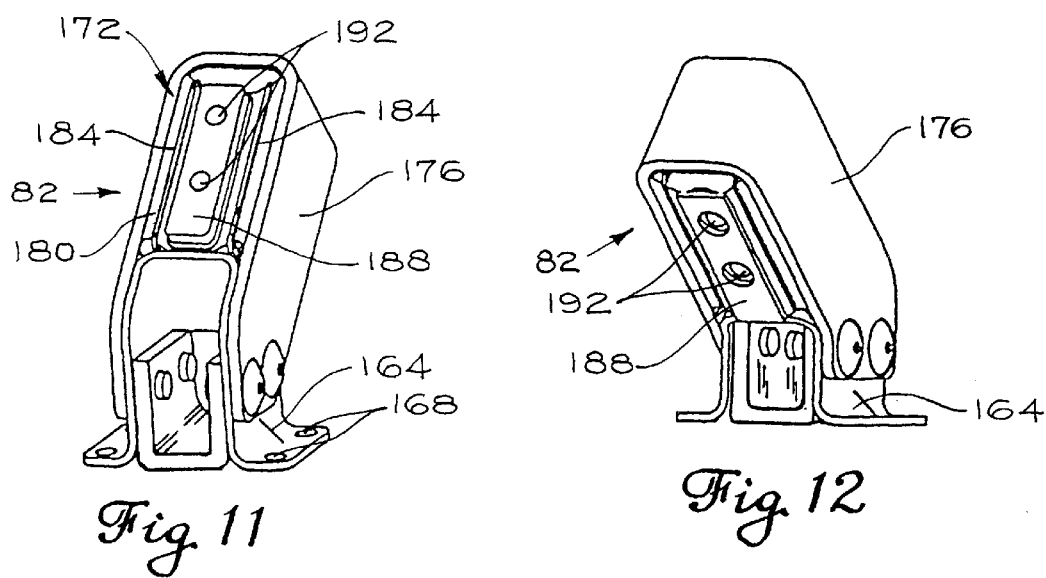

MOTORCYCLE ENGINE AND TRANSMISSION MOUNTING SYSTEM

FIELD OF THE INVENTION

The invention relates to mounting systems for motorcycle engine and transmission assemblies.

BACKGROUND

U.S. Pat. No. 4,776,423 discloses an engine and transmission assembly mounting system incorporating a plurality of tie rods, each of which permit substantially uniplanar vibration. The system also includes a resilient mounting point on the frame where the engine and transmission assembly is joined to the frame and the swing arm.

SUMMARY

The present invention provides an improvement on the mounting system disclosed in U.S. Pat. No. 4,776,423. The invention provides a motorcycle including a frame, an engine and transmission assembly, a swingarm mounted to the engine and transmission assembly at a pivot point, a tie link interconnecting the engine and transmission assembly with the frame, a front resilient mount interconnecting the engine with the frame, and a rear resilient mount interconnecting the transmission with the frame. The rear resilient mount is positioned above the pivot point where the swing arm is mounted to the engine and transmission assembly.

Other features and advantages of the invention will become apparent to those skilled in the art upon review of the following detailed description, claims, and drawings.

BRIEF DESCRIPTION OF THE DRAWINGS

FIG. 9 is a rear elevational view of the rear resilient mount.

FIG. 10 is a right side elevational view of the rear resilient mount.

FIG. 11 is a rear perspective view of the rear resilient mount.

FIG. 12 is a front perspective view of the rear resilient mount.

Figure 1:
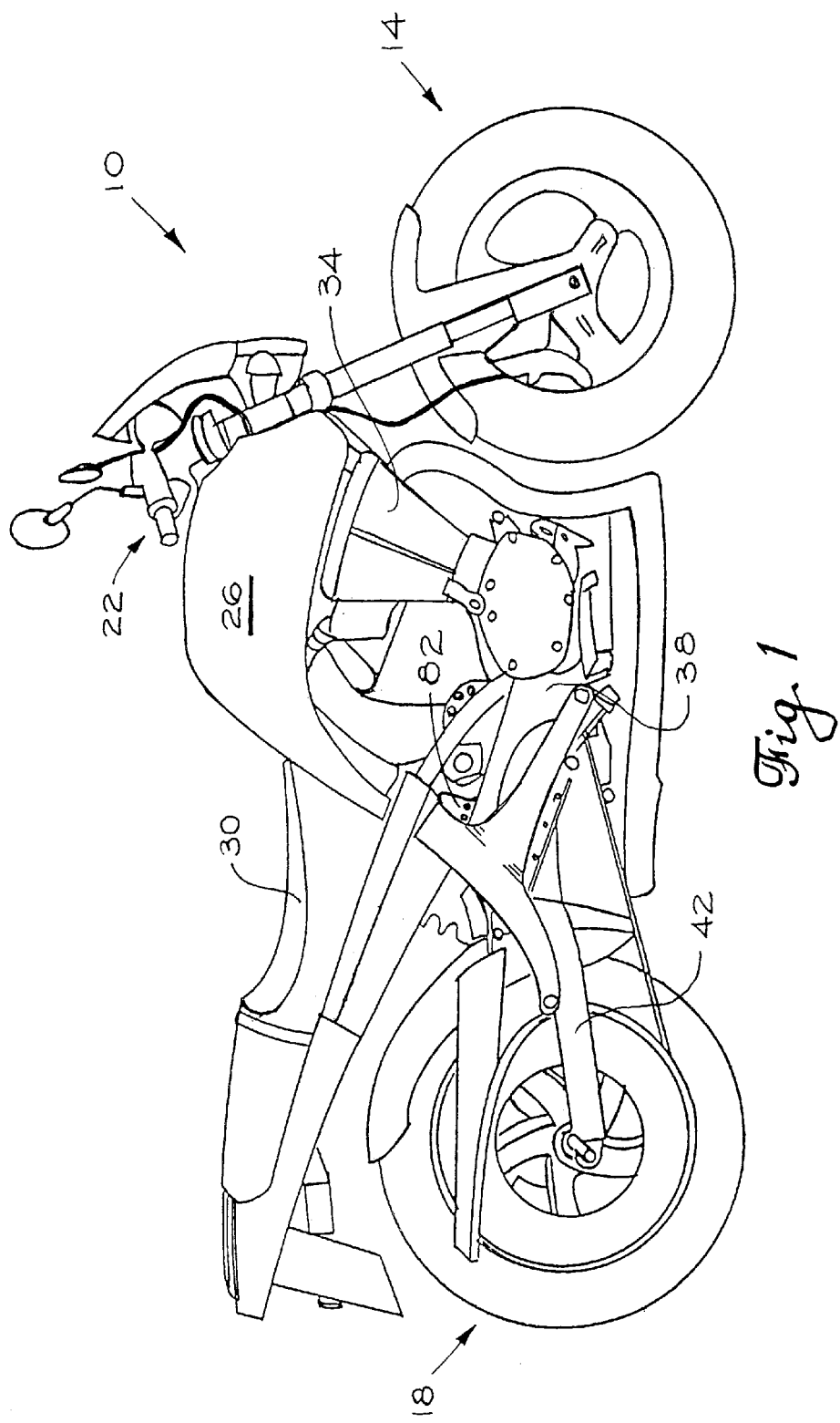
FIG. 1 is a right side elevational view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

FIG. 1 illustrates a motorcycle 10 including front and rear wheel assemblies 14, 18, handlebars 22 for steering the front wheel assembly 14, a gas tank 26, a seat 30, and an engine and transmission assembly including an engine 34 and a transmission 38. The engine and transmission assembly can be provided as an integral assembly, or as a separate engine 34 and transmission 38 that are joined together.

Figure 2:
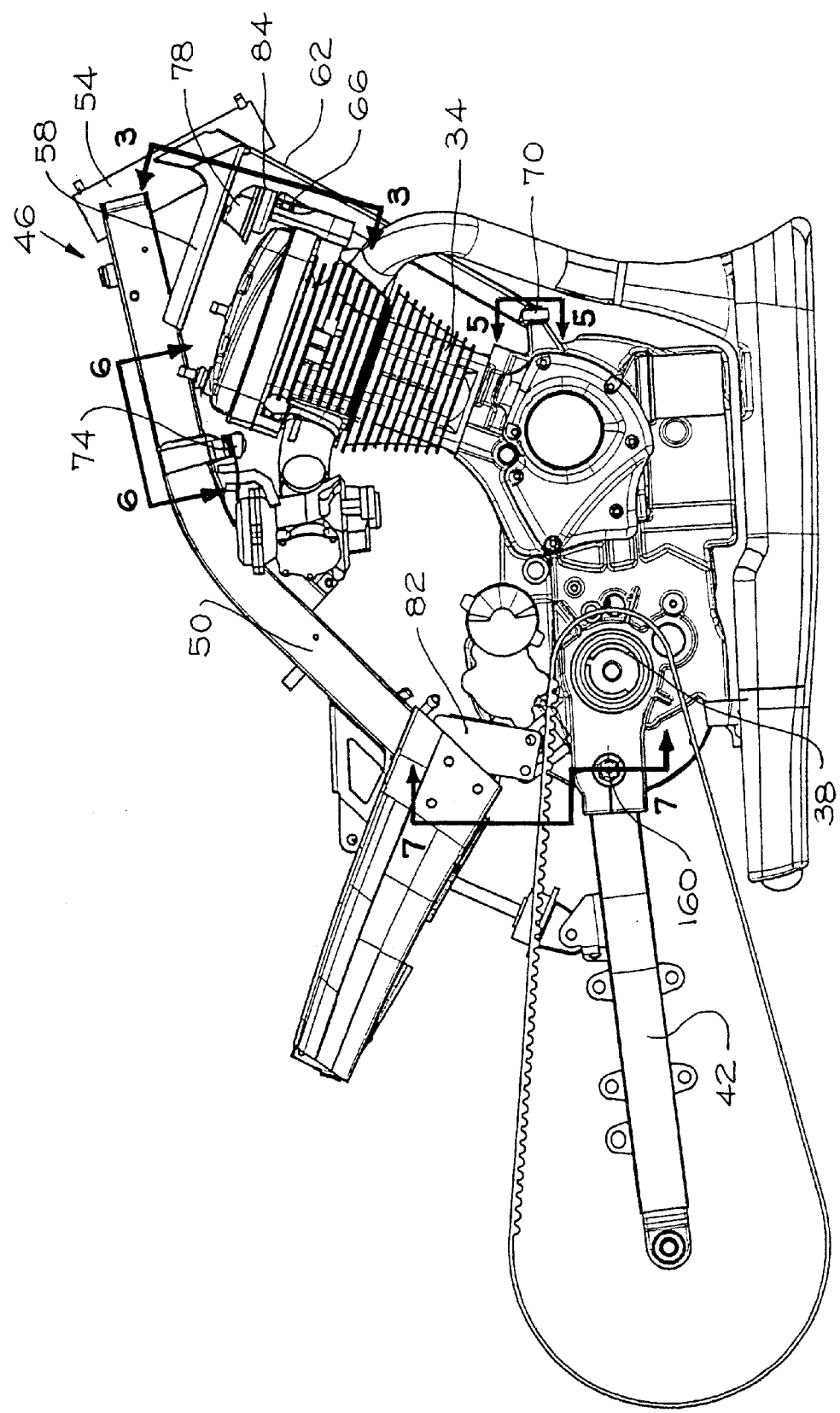
FIG. 2 is a right side elevational view of a portion of the motorcycle.

FIG. 2 better illustrates the engine and transmission assembly. The illustrated engine 34 is a single-cylinder engine, but the invention may be embodied in a motorcycle having a multiple-cylinder engine. A swing arm 42 is pivotally mounted to both the rear wheel assembly 18 (FIG. 1) and to the transmission 38 as described in more detail below. The motorcycle 10 also includes a frame 46 having an upper member 50, a steering tube 54 for the front wheel assembly 14, a truss member 58, and a front member 62. The engine and transmission assembly is mounted to the frame 46 with first, second, and third tie rods 66, 70, 74, a front resilient mount 78, and a rear resilient mount 82. The rear resilient mount 82 is attached to a rear portion of the frame 46.

Figure 3:
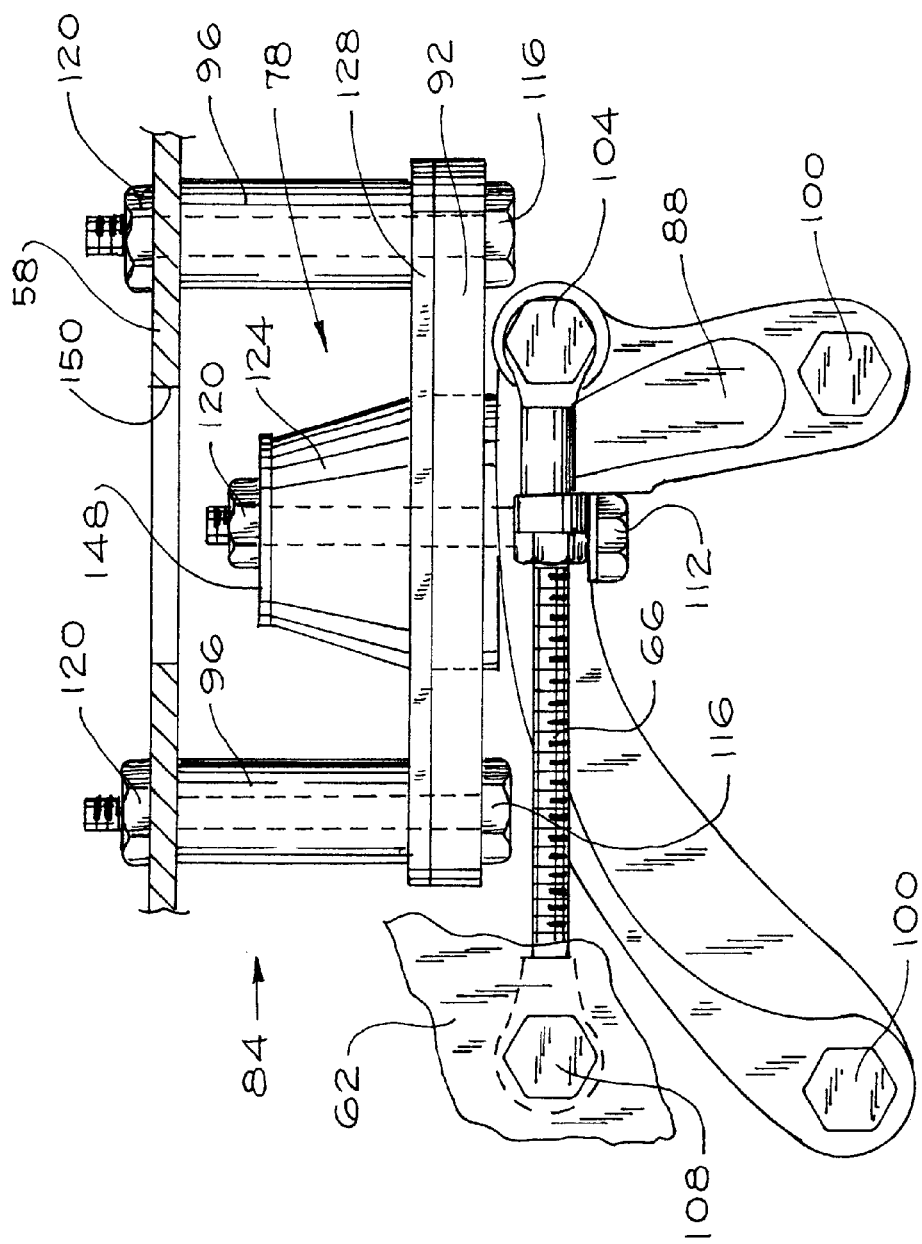
FIG. 3 is a view taken along line 3—3 in FIG. 2.
Figure 4:
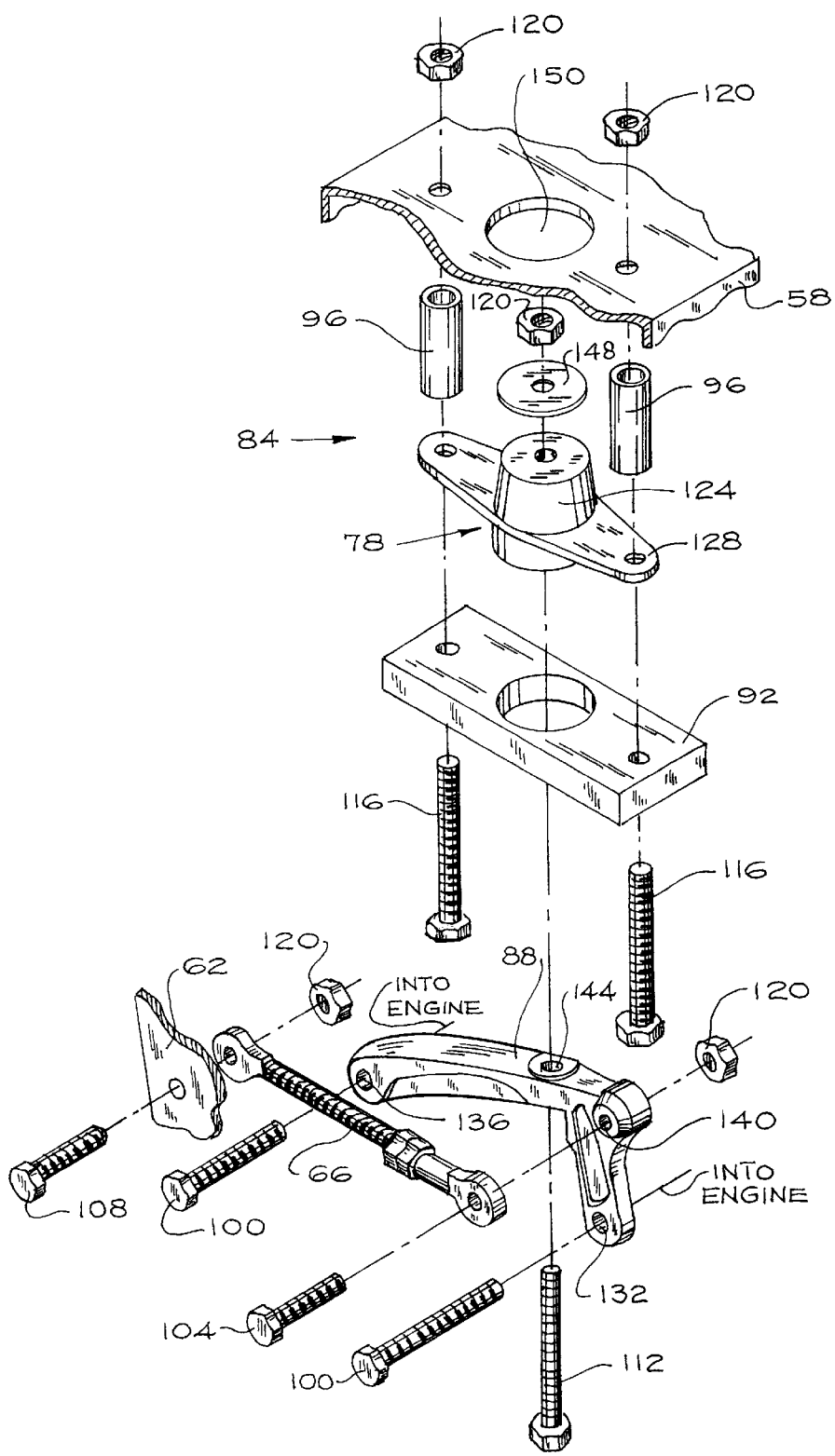
FIG. 4 is an exploded view of the upper mounting assembly.

FIGS. 3 and 4 illustrate an upper mounting assembly 84 that includes the first tie rod 66 and the front resilient mount 78. The upper mounting assembly 84 also includes a bracket 88, a plate 92, a pair of spacers 96, and a plurality of bolts 100, 104, 108, 112, 116, and nuts 120. The first tie rod 66 includes an externally threaded member and an internally threaded member, and its length is adjustable by rotating the threaded members with respect to each other. The first tie rod 66 permits substantially planar movement and vibration of the engine 34 and resists movement of the engine 34 in any non-planar directions. As used herein, "substantially planar," as used to describe the tie rods 66, 70, 74, means the plane defined by the tie rod pivoting about the mounting points at either of its opposite ends.

The front resilient mount 78 includes a rubber isolator 124 molded onto an elongated plate 128. The rubber isolator 124 extends down through a hole in the plate 92. The front resilient mount 78 isolates vibrations caused by moving parts in the engine and transmission assembly. The rubber isolator 124 absorbs substantially all vibrations that are transmitted through the bracket 88. This substantially prevents the bracket 88 and the engine and transmission assembly from coming into direct contact with the plate 92 or any part of the frame.

The bracket 88 has first, second, third, and fourth mounting holes 132, 136, 140, 144, respectively. The bolts 100 passing through the first and second mounting holes 132, 136 are threaded directly into the cylinder of the engine 34, as labeled in FIG. 4. The bolt 104 that extends through the third mounting hole 140 fastens one end of the first tie rod 66 and is secured with a nut 120. The other end of the first tie rod 66 is secured to the front member 62 of the frame 46 with the bolt 108 and a nut 120. The bolt 112 extending through the fourth mounting hole 144 also extends through the plate 92, the front resilient mount 78, and a washer 148. A nut 120 is threaded onto the bolt 112 to hold the front resilient mount 78 in place on the bolt 112. A hole 150 is provided in the truss member 58 to facilitate securing the nut 120 on the bolt 112. Bolts 116 extend up through holes in the plate 92, holes in the plate 128, the spacers 96, and holes in the truss member 58 of the frame 46 to secure the plate 92 to the frame 46 a selected distance (determined by the length of the spacers 96) from the truss member 58. The bolts 116 also secure the plate 128 to the plate 92.

Figure 5:
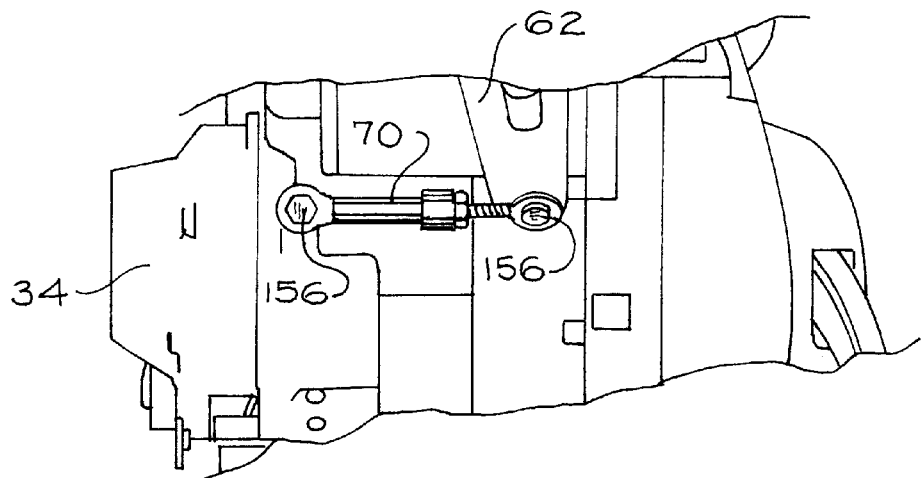
FIG. 5 is a view taken along line 5—5 in FIG. 2.
Figure 6:
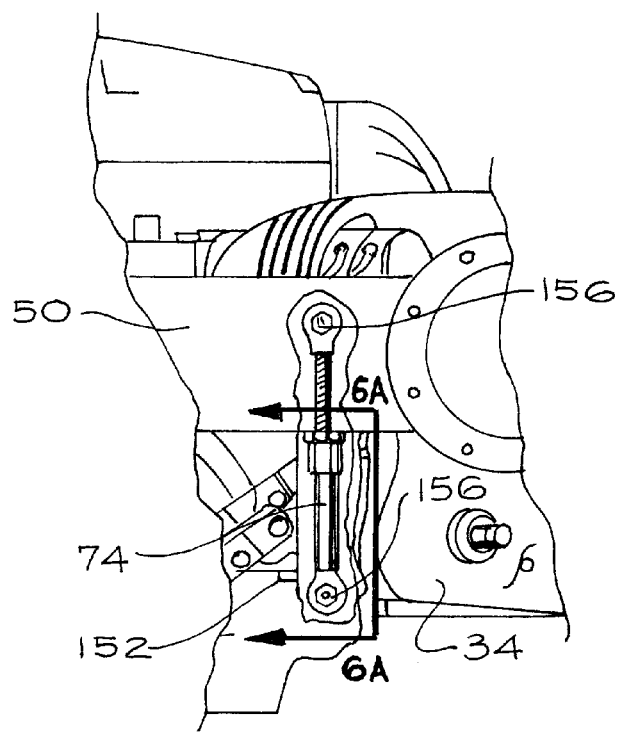
FIG. 6 is a view taken along line 6—6 in FIG. 2.
Figure 6A:
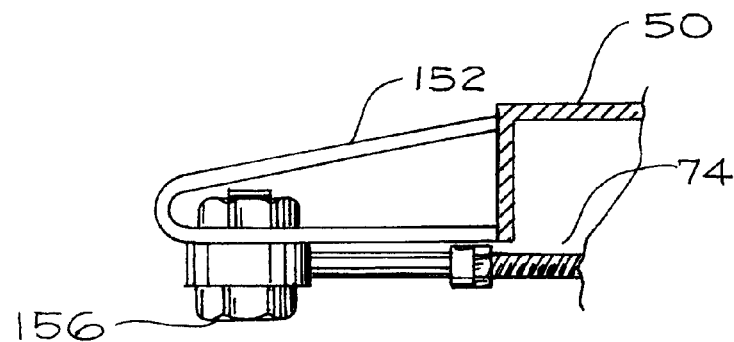
FIG. 6A is a cross section view taken along line 6A—6A in FIG. 6.

Turning now to FIGS. 5, 6, and 6A, the second and third tie rods 70, 74 are similar to the first tie rod 66, except that they may be shorter or longer depending on the positions of the mounting points for their opposite ends. The second tie rod 70 extends between the bottom of the front member 62 and a lower portion of the engine 34. The third tie rod 74 extends between a transverse extension 152 welded or fastened to the upper frame member 50 and the top of the engine 34. The second and third tie rods 70, 74 are secured at each end with suitable fasteners, such as bolts 156. Each of the second and third tie rods 70, 74 permits substantially planar motion and resists non-planar motion.

Figure 7:
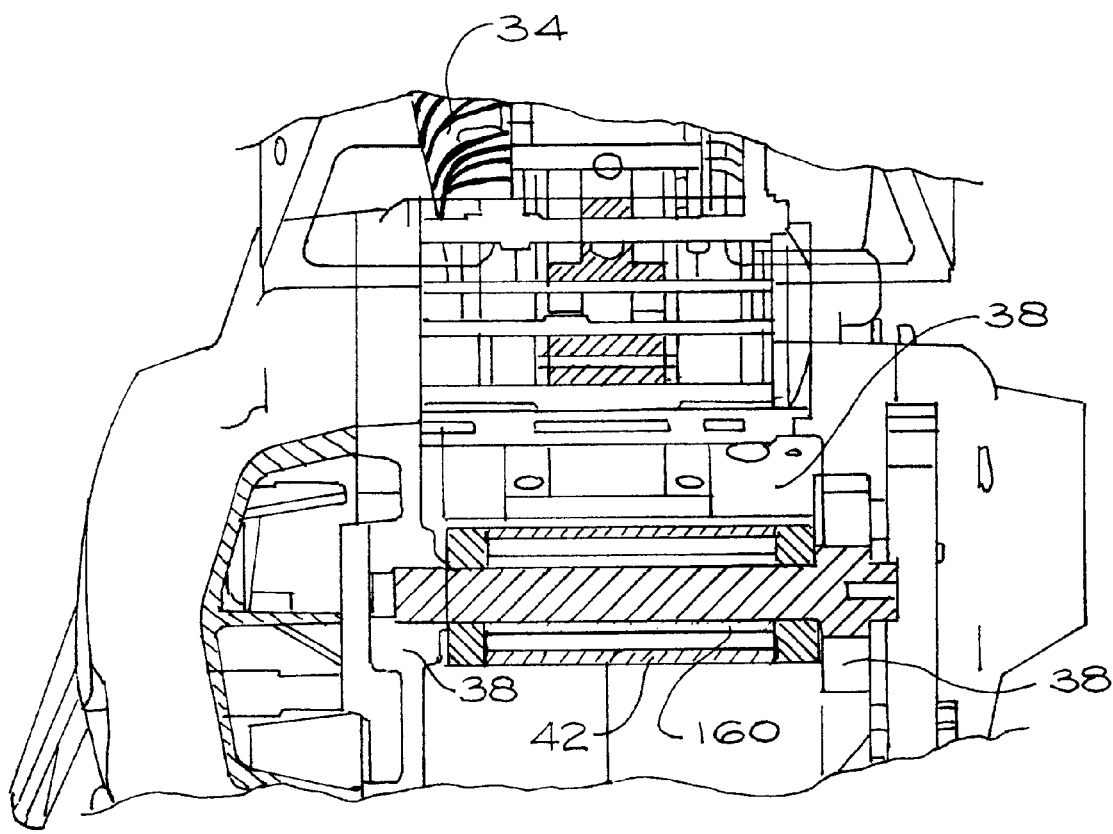
FIG. 7 is a cross section view taken along line 7—7 in FIG. 2.
Figure 8:
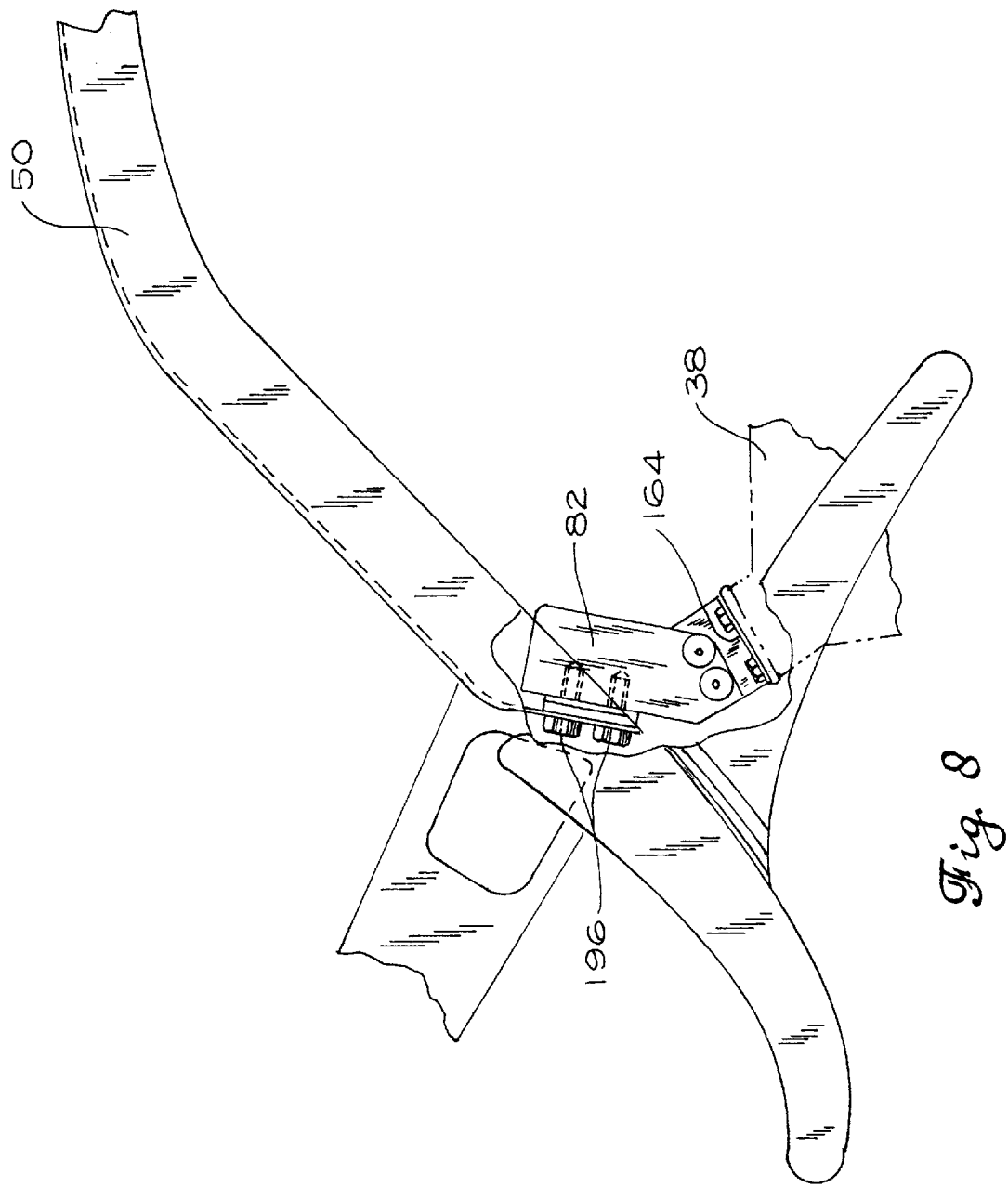
FIG. 8 is a side elevational view of a portion of the motorcycle, including the rear resilient mount.

FIG. 7 illustrates the pivot mount between the transmission 38 and swing arm 42. A bolt 160 extends through a forked portion of the transmission 38 and through the end of the swing arm 42 to provide the pivot mount. Alternatively, the swing arm 42 may have a forked end into which the a portion of the transmission 38 is received, or both or neither of the transmission 38 and swing arm 42 may have a forked portion.

FIGS. 8–12 illustrate the rear resilient mount 82, which includes a base portion 164 having mounting holes 168 for coupling the rear resilient mount 82 to the transmission 38 above the pivot mount shown in FIG. 7. A molded assembly 172 is housed within a steel housing 176 that is secured to the base portion 164. The molded assembly 172 includes a resilient member 180 molded around a pair of steel stability plates 184 and a steel mounting plate 188. The stability plates 184 provide additional stability to the molded assembly 172. The steel housing 176 is formed around the molded assembly 172 such that the molded assembly is held within the steel housing 176 by a pressure fit.

The mounting plate 188 includes a pair of mounting apertures 192 that are preferably threaded. A pair of threaded fasteners 196 (FIG. 8) extend through a portion of the frame upper member 50 and are threaded into the mounting apertures 192. Alternatively, the mounting apertures 192 may be through-bores through which bolts extend, and nuts may be threaded onto the ends of the bolts to secure the frame 46 to the rear resilient mount 82.

The resilient member 180 of the rear resilient mount 82 isolates substantially all vibrations in the engine and transmission assembly from the frame 46. The stability plates 184 substantially prevent the resilient member 180 from deforming too much under vibrational loading. The molded assembly 172 substantially prevents the mounting plate 188 and upper member 50 of the frame 46 from coming into direct contact with the housing 176 or the engine and transmission assembly.

What is claimed is:

1. A motorcycle comprising:
   a frame;
   an engine and transmission assembly;
   a rear wheel mounted to said frame for rotation about an axis;
   a swingarm mounted to said engine and transmission assembly at a pivot point;
   at least three tie links interconnecting said engine and transmission assembly with said frame;
   a front resilient mount interconnecting said engine and transmission assembly with said frame; and
   a rear resilient mount positioned above said pivot point and interconnecting said engine and transmission assembly with said frame, wherein said rear resilient mount includes a mounting plate to which said frame is mounted, a housing surrounding said mounting plate, and a resilient member positioned within said housing and between said mounting plate and said housing to dampen vibration by compression of said resilient member in a direction parallel to the axis of rotation.

2. The motorcycle of claim 1, wherein said resilient member is molded around said mounting plate, and wherein said resilient member is pressure fit within said housing.

3. The motorcycle of claim 1, wherein said frame includes an upper member extending at least partially above said engine and transmission assembly, and wherein said mounting plate of said rear resilient mount is secured to said upper member and said housing is secured to said engine and transmission assembly.

4. The motorcycle of claim 1, wherein said rear resilient mount further includes at least one stability plate between said mounting plate and said housing.

5. The motorcycle of claim 1, wherein said rear resilient mount further includes at least one stability plate, and wherein said resilient member substantially surrounds said stability plate.

6. The motorcycle of claim 1, wherein said housing of said rear resilient mount is secured to said transmission.

7. A motorcycle comprising:
   a frame having a front portion and a rear portion;
   an engine and transmission assembly;
   a rear wheel mounted to said frame for rotation about a rear wheel axis;
   a swingarm pivotally mounted for movement about a pivot axis;
   at least one tie link coupling said engine and transmission assembly to said front portion of said frame; and
   a resilient mount between said engine and transmission assembly and a mounting point on said rear portion of said frame, said mounting point being spaced from said pivot axis, wherein said resilient mount includes a mounting plate to which said rear portion of said frame is mounted, a housing surrounding said mounting plate, and a resilient member positioned within said housing and between said mounting plate and said housing to dampen vibration by compression of said resilient member in a direction parallel to the rear wheel axis of rotation.

8. The motorcycle of claim 7, wherein said mounting point is located above said pivot axis.

9. The motorcycle of claim 7, wherein said resilient member is molded around said mounting plate, and wherein said resilient member is pressure fit within said housing.

10. The motorcycle of claim 7, wherein said frame includes an upper member extending at least partially above said engine and transmission assembly, and wherein said mounting plate is secured to said upper member and said housing is secured to said engine and transmission assembly.

11. The motorcycle of claim 7, wherein said resilient mount including at least one stability plate between said mounting plate and said housing.

12. The motorcycle of claim 7, wherein said resilient mount includes at least one stability plate and said resilient member substantially surrounds said stability plate.

13. The motorcycle of claim 7, wherein said housing of said resilient mount is secured to said transmission.

14. A method of mounting an engine and transmission assembly to a motorcycle frame having a front and rear portion, the method comprising the steps of:

providing a rear wheel mounted to the frame for rotation about a rear wheel axis;

providing a swingarm;

pivotally mounting the swing arm for movement about a pivot axis;

providing at least one tie link;

coupling the engine and transmission assembly to the front portion of the frame;

providing a resilient mount including a mounting plate, a housing surrounding the mounting plate, and a resilient member positioned within the housing and between the mounting plate and the housing;

mounting the housing of the resilient mount to the engine and transmission assembly; and mounting the rear portion of the frame to the mounting plate of the resilient mount at a mounting point spaced from the pivot axis to dampen vibration by compression of the resilient member in a direction parallel to the rear wheel axis of rotation.

15. The method of claim 14, wherein the rear portion mounting step includes mounting the rear portion of the frame to the mounting plate of the resilient mount above the pivot axis.

16. The motorcycle of claim 14, wherein the resilient mount providing step includes molding the resilient member around the mounting plate, and press fitting the resilient member and within the housing.

17. The motorcycle of claim 14, wherein the resilient mount mounting step includes securing the mounting plate of the resilient mount to the transmission.

\* \* \* \* \*